Feb. 1, 1927. R. PARODI 1,616,279
OPTICAL DEVICE FOR HORIZONTAL PANORAMIC AND ZENITHAL VIEW
Filed Dec. 18, 1925
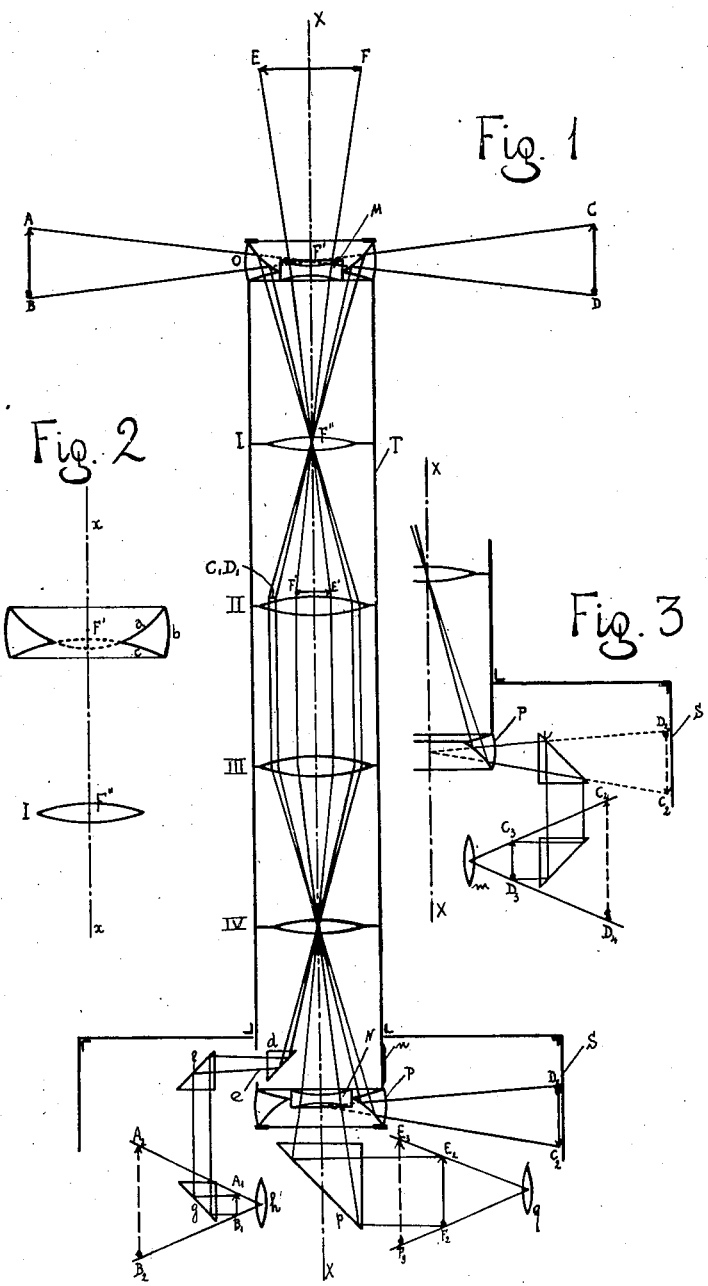
Inventor
Roberto Parodi
By Richards & Geier
Attorney Patented Feb. 1, 1927.

1,616,279

UNITED STATES PATENT OFFICE.

ROBERTO PARODI, OF GENOA, ITALY.

OPTICAL DEVICE FOR HORIZONTAL PANORAMIC AND ZENITHAL VIEW.

Application filed December 18, 1925, Serial No. 76,144, and in Italy March 19, 1925.

The present invention relates to periscopic apparatus of the type in which optical elements arranged at the top and bottom of a fixed tube are adapted to project a complete picture of all the objects within the range of the instrument upon a cylindrical screen coaxial with the tube and placed substantially at the same height as the lower optical element.

It has hitherto been suggested in periscopes adapted to include all surrounding objects within its field of vision, to mount at the upper end of the periscope tube a toric lens and at the lower end a right angled prism which is used in conjunction with an eye piece rotatably mounted at the lower end of the tube for inspecting any portion of the image.

With this system of lenses as hitherto suggested it is not possible to have the whole of the image projected on an annular screen, nor is it possible to obtain perfectly stigmatic images, while according to the present invention the astigmatism is almost fully corrected by the employment of a second toric lens mounted at the lower end of the tube.

The object of the present invention is to provide an improved periscope of the above type and with this end in view the invention consists in the combination of two toric lenses similarly and symmetrically arranged each at one end of a vertical optical fixed tube; a suitable system of converging lenses arranged between the two toric lenses, and projecting the images of the objects on the horizon, suitably deflected by the toric upper lens upon the toric lower lens, this second lens being arranged in such a position with respect to the other lenses as to project the images on a cylindrical screen, coaxial with the optical tube and placed substantially at the same height as the lower toric lens.

Another object is to provide means enabling the observer to inspect, through a suitable eye-piece rotatably mounted in the path of the rays coming out of the lower toric lens, any desired portion of the field of view of the instrument, the images being seen redressed and almost perfectly stigmatic.

Further, the invention provides means, to be adapted to the above device, enabling the observer to inspect also the objects at or about the zenith of the apparatus.

An embodiment of the invention is hereinafter described with reference to the annexed drawing, in which;

Figure 1 diagrammatically shows a vertical section of the devices, showing further the trajectories of the rays for the panoramic vision or for the direct vision of part of the entire optic field of the instrument, and further for zenithal vision.

Figure 2 is a transverse diametrical section showing the construction of one of the end lenses (toric lenses) with its conjugated lens.

Figure 3 shows a variant of the device for the direct survey of part of the horizon.

T denotes the optical vertical tube, which is of convenient diameter and length and constructed of suitable material, preferably metallic. The upper end of the tube T is open and has mounted at its lower end a suitable observation camera. This camera is formed with cylindrical walls S, co-axial with the optic tube and can be made of solid or translucent material. The walls S thus constitute a screen or a translucent diaphragm on the inner surface of which is projected the panoramic vision of the horizon. As usual, the interior of the optical tube T is blackened, whilst the portion of the screen S on which the images are projected is whitened or, if a diaphragm, is made translucent. The optical tube T could be also formed of several segments, telescoping into one another. On the telescope head a toric lens is suitably arranged, which will be constructed as shown, Figure 2, and described hereinafter.

The surfaces which form the torus of the lens include the internal curved side $a$ constituted by a branch of hyperbole having its foci at $F'$ and $F''$, while the curved sides $b$ and $c$ are constituted by arcs of circles the centres of which are respectively, at $F'$ and $F''$. Below the upper toric lens O in the optic tube and parallel to the said toric lens, a lens I is arranged, with its centre coinciding with the focus $F''$. In this manner the rays coming from an object C—D placed on the horizontal plane will, by reason of the toric lens O and of its conjugated lens I, cause a real image $C'$ $D'$ to be formed within the optic tube. In the plane on which this image is formed, a suitable converging lens II is arranged so as to deflect the rays in the direction of the optical axis of the instrument. The rays thus directed stripe the lens III, symmetrical with regard to the lens II, and are converged upon another lens IV, similar to the lens I and symmetrically arranged relative thereto. This lens IV is conjugated with another toric lens P arranged at the lower end of the tube T and symmetrically disposed with reference to the upper toric lens O. The rays coming from the lens IV, by impinging on the toric lens P pass through this lens symmetrically with regard to the rays striking on the upper toric lens O and consequently reproduce on the screen S the inverted images $C_2D_2$ of the object C—D situated in the horizontal plane of vision. Therefore a panoramic vision of the whole horizon will be projected on the screen S, the images being not deformed, but only inverted. For the purpose of redressing and magnifying some portions of the horizontal field of view of the apparatus, means are provided and arranged on the optical device. Two embodiments of suitable means will be described hereinafter, with reference to the Figures 1 and 3.

Within the tube T (Figure 1) above the lower toric lens P, and in the path of the rays conically dispersed from by the lens IV, a prism $d$ is arranged so as to reflect the rays therefrom almost horizontally through a suitable aperture $e$ bored in the optical tube and onto a suitable prism $f$ that reflects them upon another prism $g$ symmetrical with regard to the prism $f$. The rays, leaving this prism $g$, form a real image $A_1B_1$ of the object A—B on the horizon. This image is magnified by an eye-piece $h$, inserted in suitable position and which transforms the real image $A_1B_1$ into the virtual upright image $A_2B_2$. Of course, the image given by the prism $d$ and consequently by the prisms $f$, $g$ and by the eye-piece $h$ is restricted to a fraction of the field of view of the instrument, and as the rays forming the image in this case have not passed through the lower toric lens P, that corrects the deformations caused by the upper lens O, the image $A_2B_2$ will be somewhat twisted out of regular shape though redressed and magnified.

In order to correct this defect, a suitable disposition of prisms is shown, Figure 3, the system comprising a prism $i$ inserted in the path of the rays coming out almost horizontal from the lower toric lens P. The prism $i$ deflects these rays on a conjugated prism $l$ arranged below the former and symmetrical thereto, which originates a real image $C_3D_3$ of the object C—D on the horizon, the said image being redressed. A suitable eye-piece $m$, inserted in suitable position, transforms the said image $C_3D_3$ into a virtual image $C_4D_4$, which is upright, vertical and magnified with reference to the image $C_3D_3$. Yet, as the rays generating the image $C_3D_3$ have traversed the lower toric lens P the deformation of the image is corrected by the first toric lens O, and the images $C_3D_3$ and $C_4D_4$ (these images embracing a less extensive field of view, with regards to the images $A_2B_2$, Figure 1, owing to the greater divergence of the rays incident on the prism $i$), will consequently not be deformed.

The one or the other of the above referred to prism arrangements will be preferred in practice, according to whether a clearer vision of an extensive field or a more correct vision of a restricted field of view is needed.

In both cases, the prism and eye-piece systems will be mounted in suitable casings, pivoting around the optical axis X—X of the apparatus, in order to permit a complete survey of the different parts of the horizon. In the special case of the first prism arrangement, as described with reference to Figure 1, the casing in which the prisms and eye-piece are mounted could be preferably connected to a ring or annulus $n$ passed around the optical tube T and formed also with an aperture $e$ revolving with the system. Usually, by such an arrangement, also the lower toric lens P is fixed to the annulus $n$ and revolves with this latter, though without affecting in any way the projection of the horizontal panoramic view upon the screen S.

If also the field of view at or about the zenith of the apparatus is to be surveyed, this may be accomplished as follows:

As the toric lenses O and P are formed with a hole in the centre, in each hole a lens, resp. M and N, might be arranged in such a manner as to allow the zenithal vision. The upper lens M, fixed in the central hole formed in the lens O forms, in combination with the lens I, a real image $E_1F_1$, within the optic tube, T, of an object E—F placed at or about the zenith of the apparatus. The said image $E_1F_1$ will be formed on the lens II which deflects the rays so as to make them parallel to its axis. These rays are made by the lens III, to converge upon a lens IV, which projects them on the lens N arranged in the hole formed in the lower toric lens P. The rays coming out of the lens N impinge on a prism $p$ suitably arranged thereunder and come out of this prism almost horizontally, forming a real vertical image $E_2F_2$ of the object E—F, which image, by passing through an eye-piece $q$, suitably inserted, is seen as a magnified virtual image $E_3F_3$.

It is understood that the above arrangement has been described only by way of example. Thus the intermediary lenses could be formed by systems of lenses, instead of simple lenses, and in the arrangement for the zenithal observations the central portion of the intermediary lenses of the instrument might also be cut off, where only the peripheral portion is utilized. Moreover, the device for the zenithal observations could also be arranged on a different periscopic apparatus, without affecting the principle of the invention.

Furthermore, owing to the possibility of taking photographs either from the translucent screen or by suitably arranging a photo-camera on the eye piece of the direct vision arrangement, the device of the present invention could also be utilized for taking photographic panoramas at or below water level, or also for special moving pictures.

I claim:

1. In a periscope of the class described, the combination of a vertical fixed optical tube, two toric lenses symmetrically arranged at the ends of said tube and each having curved sides one of which is formed as a hyperbolic curve having its foci in the axis of the lens and the remaining sides being formed as arcs each having one of said foci as its center, a system of converging lenses arranged between the two toric lenses and projecting the images of objects on the horizon, said images being deflected by the toric upper lens upon the lower toric lens, and a cylindrical screen coaxial with the optical tube and placed substantially at the same height as the lower toric lens and upon which screen said images are projected by said lower toric lens.

2. In an optical device according to claim 1, a two-prism system arranged laterally and in front of the lower toric lens, a magnifying eye-piece upon which images showing on the horizon are projected when deflected by said prisms, and a casing in which the prisms and eye-piece are mounted, said casing being revoluble about the optical axis of the tube.

3. In an optical device for the panoramic vision of the horizon and also for the zenithal vision of the horizon, the combination of upper and lower toric lenses having central openings, lenses mounted in said central openings, and a prism and eye-piece system arranged below the lower toric lens.

ROBERTO PARODI.